United States Patent Office 3,492,844
Patented Feb. 3, 1970

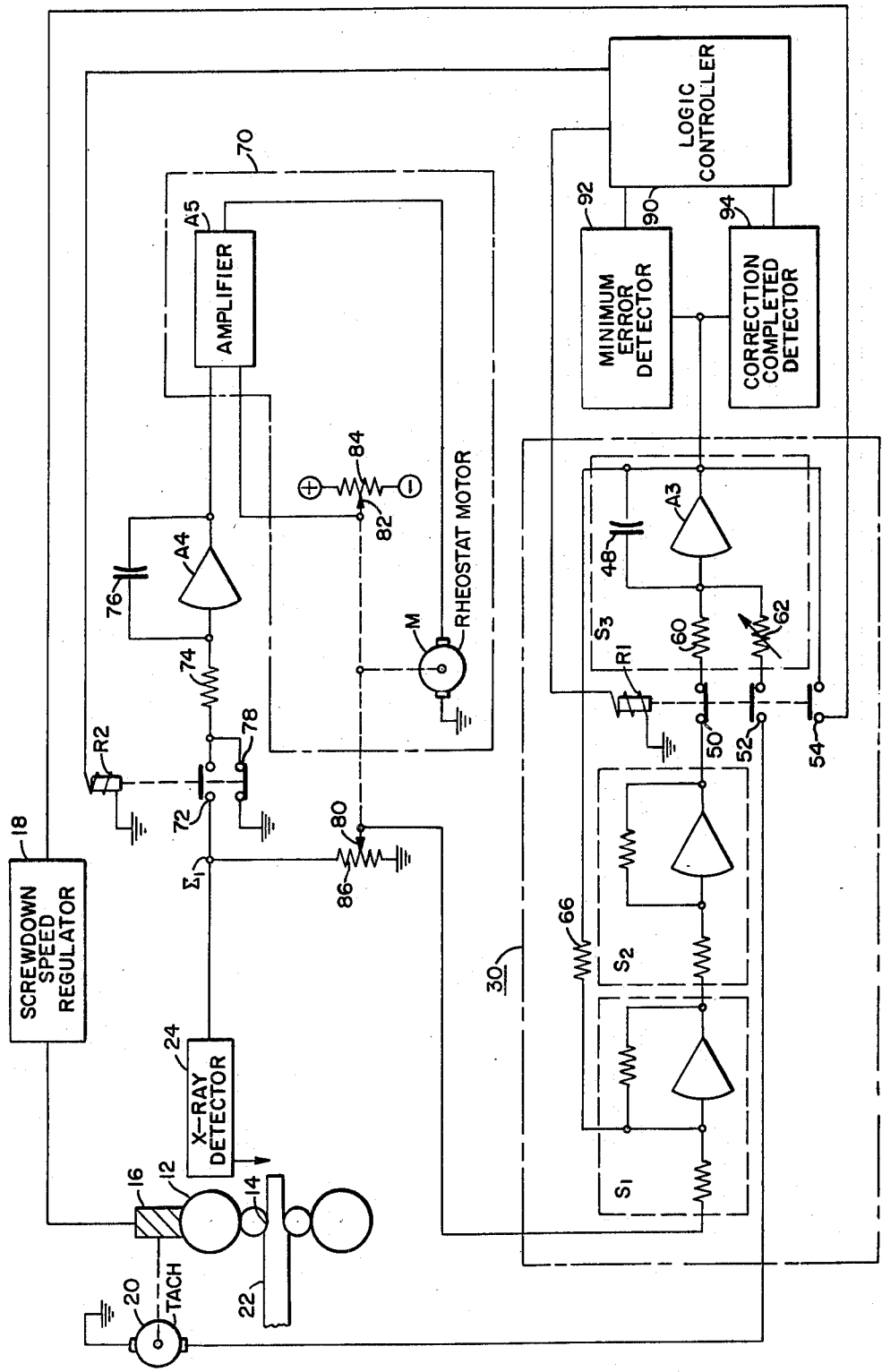

3,492,844
AUTOMATIC GAUGE CONTROL SYSTEM WITH AN ADAPTIVE GAIN LOOP
Antonio Vicente Silva, Buffalo, N.Y., assignor to Westinghouse Electric Corporation, Pittsburgh, Pa., a corporation of Pennsylvania
Filed Oct. 26, 1967, Ser. No. 678,367
Int. Cl. B21b 37/12
U.S. Cl. 72—8                 6 Claims

ABSTRACT OF THE DISCLOSURE

This disclosure pertains to a screwdown automatic gauge control system having a self-correcting gain loop to adapt to the hardness of the material being rolled. The gauge error still existent after an initial adjustment of the screws as a result of a gauge and material change is used to adapt the gain of the system such that, under ideal conditions, a gauge change with the same material can be achieved in one additional movement of the screws.

BACKGROUND OF THE INVENTION

This invention relates, in general, to an automatic gauge control system and, more particularly, to a screwdown automatic gauge control system with an adaptive gain loop.

More conventional automatic gauge control systems operate in the following sequence:

(1) A gauge error greater than a minimum amount is measured by an X-ray gauge as the strip exits from a rolling stand.

(2) The measured error is retained in memory and the screwdowns are moved a distance proportional to the measured error.

(3) After the screwdown movement is completed, a time delay is initiated to allow for the strip to move from the roll bite to the X-ray gauge. During this "transport time," no screwdown correction is allowed to take place.

(4) Once the "transport time" has elapsed, the above described sequence can be repeated if a gauge error is still detected by the X-ray gauge and a new correction can then be made.

One of the critical adjustments required for proper and efficient operation of the automatic gauge control system is that the total screws movement which occurs in response to the measured error temporarily held in memory be accurate. Although there is no direct way to measure the actual amount of roll movement, an indirect method is to use as position feedback the signal from a tachometer coupled to the screwdown motor; the integration of this tachometer signal will then provide a position feedback signal. For a particular type of material being rolled, this signal can be adjusted in order to actually represent the total increase or decrease in the roll bite as the result of the screwdown correction. However, if a different type of material is rolled, the system would go out of calibration.

Suppose, for example, the system was calibrated correctly with a certain type of material in the roll bite. Hence, in response to a gauge error, the screws will move a certain number of revolutions, and the gauge error will be corrected. Should a harder material then be rolled, and the *same* gauge error be measured, the screws will respond running the *same* amount of total revolutions as in the previous case. However, the roll gap will *not* change by the same amount since the harder material will cause a greater deformation in the mill housing because of its spring effect. Thus, the automatic gauge control will undercorrect and the practical result will be that many successive screw movements would be required to correct for a gauge error that would have been eliminated in a single movement if the calibration had still been valid.

In more conventional automatic gauge control systems, a "hardness switch" is provided for the operator which will permit a change in the gain of this system as much as 10 to 1. It is the responsibility of the operator to change the position of this switch for different materials when he systematically notices that the system is under or overcorrecting. Such adjustment is quite difficult and rarely is made correctly.

SUMMARY OF THE INVENTION

It is, therefore a general object of the present invention to provide a new and improved automatic gauge control system for controlling the thickness of a work product on the exit side of the rolling stand.

Another object of the present invention is to provide a new and improved automatic gauge control system which is self-calibrating to the hardness of the material being rolled.

An additional object of the present invention is to provide a new and improved automatic gauge control system which eliminates the need for manual adjustment for material hardness.

A further object of the present invention is to provide a new and improved automatic gauge control system which provides for a faster on-gauge work product.

A still further object of the present invention is to provide a new and improved automatic gauge control system that will recalibrate itself within one movement of the initial calibration.

In accordance with the principles of the present invention, the gain of an automatic gauge control system is automatically adjusted by means of an adaptive gain loop. Unlike the conventional system, after the "transport time" has expired, the gauge error signal still existent is rapidly measured and temporarily held in memory. A "gain change" servo is positioned in accordance with the remaining error increasing the gain of the automatic gauge control system if the remaining error is positive (heavy gauge exists) or decreasing the gain of the previous screwdown if the remaining error is negative (light gauge exists). As soon as the gauge error is in memory a new screwdown correction is allowed to occur. Any future screwdown movement will now be made with the newly adjusted gain and after each correction, the gain loop will search the gain value for which a correction can be completed within one additional movement of the screws. The gain loop will then perform basically as an operator would, recalibrating the system's gain when a different set of rolling conditions disturbs the initial calibration.

These and other objects and advantages of the invention will become more apparent upon consideration of the following detailed description along with the attached drawing.

DESCRIPTION OF THE DRAWING

The single figure is a schematic representation of an automatic gauge control system arranged in accordance with the principles of the present invention.

DESCRIPTION OF THE PREFERRED EMBODIMENT

More specifically, there is shown in the figure an automatic gauge control system 10 which cooperates with the rolling stand 12 to provide a desired roll bite 14. Vertical movement of the upper rollers in the roll stand 12 is accomplished through a conventional screwdown mechanism 16 which is controlled through energization of a screwdown speed regulator 18. Monitoring the movement of the screwdown mechanism 16 is a tachometer 20 which provides an output signal as long as the screwdown mechanism 16 is in operation. A workpiece 22 is fed into the rolling stand 12 from left to right through the roll bite 14 to provide a work product having a predefined thickness. An X-ray detector 24 monitors the thickness of the work product and provides an input signal proportional to the thickness above or below nominal to the input summing junction $\Sigma_1$. An existing screwdown position regulator 30 which has as an input a portion of the signal at input junction $\Sigma_1$ provides an output to the screwdown speed regulator 18 for providing an initial calibration of the roll set 12.

The existing screwdown position regulator 30 is comprised of three amplifier stages: $S_1$, $S_2$ and $S_3$. The first stage $S_1$ consists of an operational amplifier $A_1$ operating as a straight amplifier and accepting at the input a portion of the signal at input junction $\Sigma_1$.

The second amplifier stage $S_2$ is used as an inverter to the output of the first amplifier stage $S_1$.

The third amplifier stage $S_3$ functions primarily as a memory device. An operational amplifier $A_3$ is provided with a capacitor element 48 operatively connected between the output and input sides of amplifier $A_3$. Input to operational amplifier $A_3$ is normally achieved from the output of amplifier $A_2$ by the normally closed relay contact 50 of relay R1, which allows the input to pass through the input resistor 60 to operational amplifier $A_3$. A second source of input for operational amplifier $A_3$ is from the output signal of the tachometer 20 when the normally open contact 52 of relay R1 is closed to allow the tachometer output signal to pass through a variable resistor element 62 which is then connected to the input of operational amplifier $A_3$. The output of operational amplifier $A_3$ is then permitted to pass to the screwdown speed regulator 18 when the normally open contact 54 of relay R1 is closed. The output signal of operational amplifier $A_3$ is fed back as negative feedback through resistor 66 to the input of operational amplifier $A_1$.

A gain changer servo follower 70 is provided and is responsive to the input signal at input junction $\Sigma_1$ when the normally open relay contact 72 of relay R2 is closed. The full signal at input junction $\Sigma_1$ is then fed to operational amplifier $A_4$ through input resistor 74. As long as relay contact 72 is closed, the input signal is integrated by means of a capacitive element 76 operatively connected between the output and input sides of operational amplifier $A_4$. During the normal position of relay R2, relay contact 78 is dropped to ground the input of the operational amplifier $A_4$. The output of operational amplifier $A_4$, which is the total integrated input signal, is connected to an amplifier $A_5$ which provides an operative signal to a motor operated rheostat M.

The motor operated rheostat M is mechanically connected by a shaft to two wipers 80 and 82 respectively. Rotation of the shaft of the motor operated rheostat M will move the wiper 82 up or down on the resistive element 84, the upper end of which is connected to a source of positive potential (+) and the lower end connected to a source of negative potential (−). Wiper 82 is connected electrically to provide an additional input to the amplifier $A_5$. Wiper 80 moves upwards and downwards along a resistive element 86 which is connected between the input terminal $\Sigma_1$ and ground. The movement of wiper 80 determines the level of the input signal to the resistor 42 of operational amplifier $A_1$; that is, the input signal at resistor 42 is equal to the input signal at terminal $\Sigma_1$ times the ratio of the potential difference existing between wiper 80 and ground to the total signal existing between input terminal $\Sigma_1$ and ground.

The motor operated rheostat M will remain in motion as long as the net output signal from amplifier $A_5$ is other than zero. This situation will occur when the value of the two inputs which are unequal in polarity are not equal in magnitude. On the other hand, as soon as the inputs are matched to provide a net input signal of zero the output of amplifier $A_5$ is likewise zero and thus the motor operated rheostat M will stop.

Operation of the relays R1 and R2 is provided by the logic controller 90 which provides for energization and deenergization of the relays R1 and R2 at predetermined conditions. The determination of these conditions is realized in part by a minimum error detector 92 which is responsive to the output of operational amplifier $A_3$ to provide an energizing signal to the logic controller 90 whenever the X-ray detector 24 determines the thickness of the work product 22 is greater than nominal. Also providing a signal to the logic controller 90 is a correction completed detector 94 which is responsive to the output of operational amplifier $A_3$ being zero to transmit a signal to the logic controller 90.

During the normal rolling operation of the roll set 12 the relays R1 and R2 are in the positions as shown in the figure. The X-ray detector 24 provides an input signal to terminal $\Sigma_1$ which is proportional to the actual thickness of the work product 14 minus the preset and desired reference thickness. The input signal from terminal $\Sigma_1$ is then connected to ground through resistor element 86. Meanwhile, a proportionate amount of the input signal is picked off by wiper 80 and fed to the existing screwdown position regulator 30. The input signal passes through operational amplifiers $A_1$, $A_2$ and $A_3$ to provide a proportionate output signal. Once the magnitude of the output signal is equal to or greater than a value which is preset in the minimum error detector 92, a signal is then transmitted to the logic controller 90 which then provides an energizing signal to pick up relay R1. When relay contact 50 of relay R1 opens the circuit previously existing between operational amplifier $A_2$ and operational amplifier $A_3$, the magnitude of the error signal is then held or stored in memory by the capacitive element 48. With relay contact 54 of relay R1 connecting the circuit between amplifier $A_3$ and the screwdown speed regulator 18, the screwdown 16 is energized to cause an upward or downward movement of the upper rolls of roll set 12 depending upon the error being either positive or negative. The tachometer 20 monitors the speed of the screwdown 16 and provides an input signal through resistor 22 to amplifier $A_3$ since relay contact 52 has closed the circuit therebetween. The input signal provided from the tachometer 20 is of a polarity opposite to that of the signal previously stored in capacitive element 48 thus discharging the capacitive element 48 during the time in which the tachometer signal 20 is operatively connected to one side of the capacitive element 48. Continued application of the signal from the tachometer 20 will eventually decrease the signal stored in the capacitive element 48 to zero whereupon the correction completed detector 94 transmits a signal to the logic controller 90 which will provide energization to relay R2 after a time inversely proportional to the mill speed (transport time). That is, the upper rolls of roll stand 12 continue to adjust until the original gauge correction is made or until the output of operational amplifier $A_3$ is at a zero level. Presumably then, the roll bite 14 should be sufficient to cause the proper and desired thickness to be detected at the X-ray detector 24. After a time delay equal to the time acquired for the workpiece 22 to proceed from the roll bite 14 to the X-ray detector 24, the logic controller 90 energizes relay R2 which then permits the signal at terminal $\Sigma_1$ to connect to the gain changer servo follower 70. Any error above nominal is then integrated and stored in the capacitive element 76. After this signal is integrated, for a predetermined period of time relay R2 is deenergized. While the signal is being integrated, the motor operated rheostat M is moving wiper 82 to a position such that the net input voltage to amplifier $A_5$ is zero whereupon the motor operated rheostat M comes to a position of rest. The movement of the motor operated rheostat M has similarly caused movement of the wiper 80 which controls the level of the input signal to the existing screwdown position regulator 30. Thus, the system has automatically recalibrated itself by providing a gain which will correspond to that of the material being rolled. Hence, when a new correction is required, it will be made in the proper amount for the particular material being rolled.

The foregoing description has been presented only to illustrate the principles of this invention. Accordingly, it is desired that the invention not be limited by the embodiments described, but, rather that it be accorded an interpretation consistent with the scope and spirit of its broad principles.

I claim as my invention:

1. In a self-calibrating gauge control system for operating the screwdowns of a rolling stand, the combination of
    measuring means for measuring the thickness of the work product from said rolling stand and providing a thickness signal proportional to the above or below nominal thickness thereof,
    position regulator means responsive to said thickness signal for providing a position signal to cause said screwdowns to move a predetermined distance proportional to said above or below nominal thickness, and
    calibrating means cooperating with said position regulator means and responsive to said thickness signal to change the proportionality constant of said position regulator means in order to provide an on-gauge work product.

2. The self-calibrating gauge control system as set forth in claim 1, wherein after a first movement of said screwdowns has actuated by said position regulator means, any remaining above or below thickness of said work product as detected by said measuring means in the form of a thickness signal is used by said calibrating means to re-calibrate said position regulator means such that additional gauge requirements of said screwdowns will thereby adjust to provide an on-gauge work product for the same material hardness within a minimum number of movements of said screwdowns.

3. The self-calibrating gauge control system as set forth in claim 1, wherein said position regulator means includes:
    minimum error detector means for initiating said position signal to cause screwdown movement relative to the above or below nominal thickness signal,
    correction completed detector means for sensing the completion of said screwdown movement relative to said above or below nominal thickness signal and providing a control signal, and
    control means responsive to said control signal for disconnecting said position regulator means and connecting said calibrating means to said measuring means after a predetermined time delay.

4. The self-calibrating gauge control system as set forth in claim 1, wherein said calibrating means alter proportionately the level of any above or below nominal thickness signal to said position regulator means.

5. The self-calibrating gauge control system as set forth in claim 1 wherein said calibrating means includes integrating means responsive to said above or below nominal thickness signal for a predetermined period of time and providing an error accumulation signal gain changing means responsive to said error accumulation signal and including a servo for altering the gain of said position regulator means in direct proportion to said error accumulation signal.

6. The self-calibrating gauge control system as set forth in claim 3 wherein said system also includes logic controller means for
    (a) activating said position controller means and deactivating said self-calibrating means in response to an error signal from said minimum error detector means and until the occurrence of a control signal from said correction completed detector means
    (b) deactivating said position controller means after the occurrence of said control signal and activating said self-calibrating means after a predetermined time delay following said control signal and for a predetermined operating period.

References Cited

UNITED STATES PATENTS

| 3,186,200 | 6/1965 | Maxwell | 72—8 |
| 3,194,035 | 7/1965 | Smith | 72—8 |
| 3,328,987 | 7/1967 | Feraci | 72—8 |
| 3,330,142 | 7/1967 | Thompson | 72—8 |

MILTON S. MEHR, Primary Examiner